(12) United States Patent
Nantz et al.

(10) Patent No.: US 6,671,609 B2
(45) Date of Patent: *Dec. 30, 2003

(54) TIRE PRESSURE VEHICLE SPEED LIMITING

(75) Inventors: John S. Nantz, Brighton, MI (US); Riad Ghabra, Dezrborn Heights, MI (US); Qingfeng Tang, Novi, MI (US); Salman Khreizat, Dearborn, MI (US)

(73) Assignee: Lear Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/216,123

(22) Filed: Aug. 9, 2002

(65) Prior Publication Data

US 2003/0033072 A1 Feb. 13, 2003

Related U.S. Application Data

(63) Continuation-in-part of application No. 09/730,958, filed on Dec. 5, 2000, now Pat. No. 6,434,470.

(51) Int. Cl.[7] .............................................. B60K 31/00
(52) U.S. Cl. ........................... 701/93; 701/99; 340/442
(58) Field of Search ............................ 701/93, 99, 88; 702/47, 138; 477/104, 108, 120, 125; 340/444, 442, 443

(56) References Cited

U.S. PATENT DOCUMENTS

| | | | |
|---|---|---|---|
| 3,916,688 A | 11/1975 | Dendy et al. ............. 73/178 T |
| 4,101,870 A | 7/1978 | Ekman ....................... 340/459 |
| 4,450,431 A | 5/1984 | Hochstein ................... 340/447 |
| 4,670,845 A | 6/1987 | Etoh .......................... 701/301 |
| 4,909,074 A | 3/1990 | Gerresheim et al. ....... 73/146.4 |
| 4,951,208 A | 8/1990 | Etoh ............................ 701/97 |
| 5,156,230 A | 10/1992 | Washburn ................... 180/170 |
| 5,165,497 A | 11/1992 | Chi ............................. 180/169 |
| 5,479,171 A | 12/1995 | Schuermann ............ 340/10.41 |
| 5,485,381 A | 1/1996 | Heintz et al. ................. 701/93 |
| 5,546,308 A | 8/1996 | Yamamoto ................... 701/93 |
| 5,557,552 A | 9/1996 | Naito et al. ................. 702/148 |
| 5,573,611 A | 11/1996 | Koch et al. ............... 152/152.1 |
| 5,661,651 A | 8/1997 | Geschke et al. ............... 70/88 |
| 5,665,026 A | 9/1997 | Linden ..................... 435/252.3 |
| 5,705,746 A | 1/1998 | Trost et al. .................. 73/146 |
| 5,740,548 A | 4/1998 | Hudgens ........................ 701/35 |
| 5,774,047 A | 6/1998 | Hensek, IV ................. 340/442 |
| 5,793,285 A | 8/1998 | Wehinger .................... 340/443 |
| 5,976,056 A | 11/1999 | Matsumoto et al. ........ 477/125 |
| 5,982,279 A | 11/1999 | Tominaga et al. .......... 340/444 |
| 6,092,028 A | 7/2000 | Naito et al. .................. 702/47 |
| 6,426,694 B1 * | 7/2002 | Larson ........................ 340/441 |
| 6,518,875 B2 * | 2/2003 | DeZorzi ...................... 340/442 |

* cited by examiner

Primary Examiner—Marthe Y. Marc-Coleman
(74) Attorney, Agent, or Firm—Bill C. Panagos

(57) ABSTRACT

Tire over- or under-inflation can create problems in vehicle operation. To limit the effects of out-of-range tire pressure, vehicle speed is automatically controlled if the vehicle speed is not appropriate for either or both of measured tire air pressure and measured tire temperature.

24 Claims, 3 Drawing Sheets

TIRE PRESSURE VEHICLE SPEED LIMITING

CROSS-REFERENCE TO RELATED APPLICATIONS

This application is a continuation-in-part of U.S. patent application Ser. No. 09/730,958 filed Dec. 5, 2000 now U.S. Pat. No. 6,434,470, which is incorporated by reference herein in its entirety.

TECHNICAL FIELD

The present invention relates to measuring vehicle tire air pressure and utilizing these measurements.

BACKGROUND ART

The air pressure within inflated vehicle tires is an important parameter for vehicle operation. Vehicle dynamics are closely linked to tire performance. These dynamics affect many aspects of vehicle operation, including handling, braking, rollover characteristics, and the like. Tire pressure also affects the life of the tire. Excess tire pressure may make the tire more susceptible to puncture and, if extreme, to burst damage. Tire under-pressure may result in the generation of excess heat, particularly at elevated vehicle speeds. To ensure proper tire performance, vehicle tires are typically given a range of inflation pressures based on the tire type, vehicle type, vehicle configuration and use, expected driving conditions, and the like. Despite its importance, tire inflation pressure may at times fall outside of specified ranges. Tires often lose air pressure gradually, making the point at which inflation pressure drops below the specified value difficult to detect. Many air pressure gauges for use with vehicle tires are inaccurate, resulting in under-inflation or over-inflation even when proper care is taken. Further, modern run-flat tires provide limited performance even in the presence of substantial pressure loss, making such loss difficult for the vehicle operator to detect.

In-vehicle tire pressure monitoring systems are currently available. Typically, these systems include a tire pressure sensor built into the tire or attached to the tire valve stem. Each sensor relays measured tire pressure to an associated receiver via a wireless link. Tire pressure information is then provided to the vehicle operator by an indicator or graphic display on the vehicle dashboard. Such a display, however, may not solve the problem of out-of-range tire pressure if the display is either unnoticed, misinterpreted, or ignored by the vehicle operator. What is needed is to automatically reduce the effects of out-of-range vehicle tire pressure.

DISCLOSURE OF INVENTION

The present invention automatically controls vehicle speed if the vehicle speed is not appropriate for measured tire air pressure, measure tire temperature, or both.

A method of limiting vehicle speed is provided. The air pressure and temperature in at least one tire are sensed, as well as the vehicle speed. At least one threshold is determined based on at least one parameter of vehicle operation. A determination is made as to whether or not the vehicle speed is appropriate for each tire based on the sensed tire air pressure, the sensed tire temperature and on each determined threshold. The vehicle speed is automatically controlling if the vehicle speed is not appropriate for each tire.

In various embodiments of the present invention, the vehicle speed is determined to be not appropriate for the tire if the tire pressure is greater than a maximum pressure threshold, if the tire pressure is less than a minimum threshold, if the tire temperature is greater than a maximum temperature threshold and/or if the tire temperature is less than a minimum temperature threshold.

In other embodiments of the present invention, the at least one parameter of vehicle operation consists of at least one from a set including vehicle speed, vehicle load, vehicle load distribution, four-wheel drive mode, towing mode, automatic suspension mode, traction control operation, automatic brake system control, tire location, tire air pressure, air pressure in other tires, tire temperature, temperature in other tires, ambient air pressure, and ambient temperature.

A system for limiting vehicle speed is also provided. The system includes at least one tire pressure sensor generating a pressure signal based on the pressure of air within a tire. At least one tire temperature sensor generates a temperature signal based on the temperature within the tire. A vehicle speed sensor generates a signal based on vehicle speed. A power plant causes the vehicle to move at the vehicle speed based on power plant control signals. Control logic generates at least one power plant control signal to automatically control vehicle speed if the vehicle speed is not appropriate for at least one tire based on the sensed tire air pressure, sensed tire temperature and on at least one vehicle operating condition.

A method of limiting vehicle speed is also provided. Tire pressure in at least one tire is determined based on pressure sensed within the tire. The vehicle speed is determined. The vehicle maximum speed is automatically limited if the vehicle speed is not appropriate for each tire based on the sensed tire air pressure. Tire temperature is determined in the at least one tire based on temperature sensed within the tire. Vehicle maximum speed is automatically limited if the vehicle speed is not appropriate for each tire based on the sensed tire temperature. Vehicle speed is also automatically limited if the vehicle speed is not appropriate for each tire based on the sensed tire temperature and based on the sensed tire pressure.

These and other objects, features and advantages of the invention are readily apparent from the following detailed description of the best mode for carrying out the invention when taken in conjunction with the accompanying drawings.

BEST MODE FOR CARRYING OUT THE INVENTION

Figure 1:
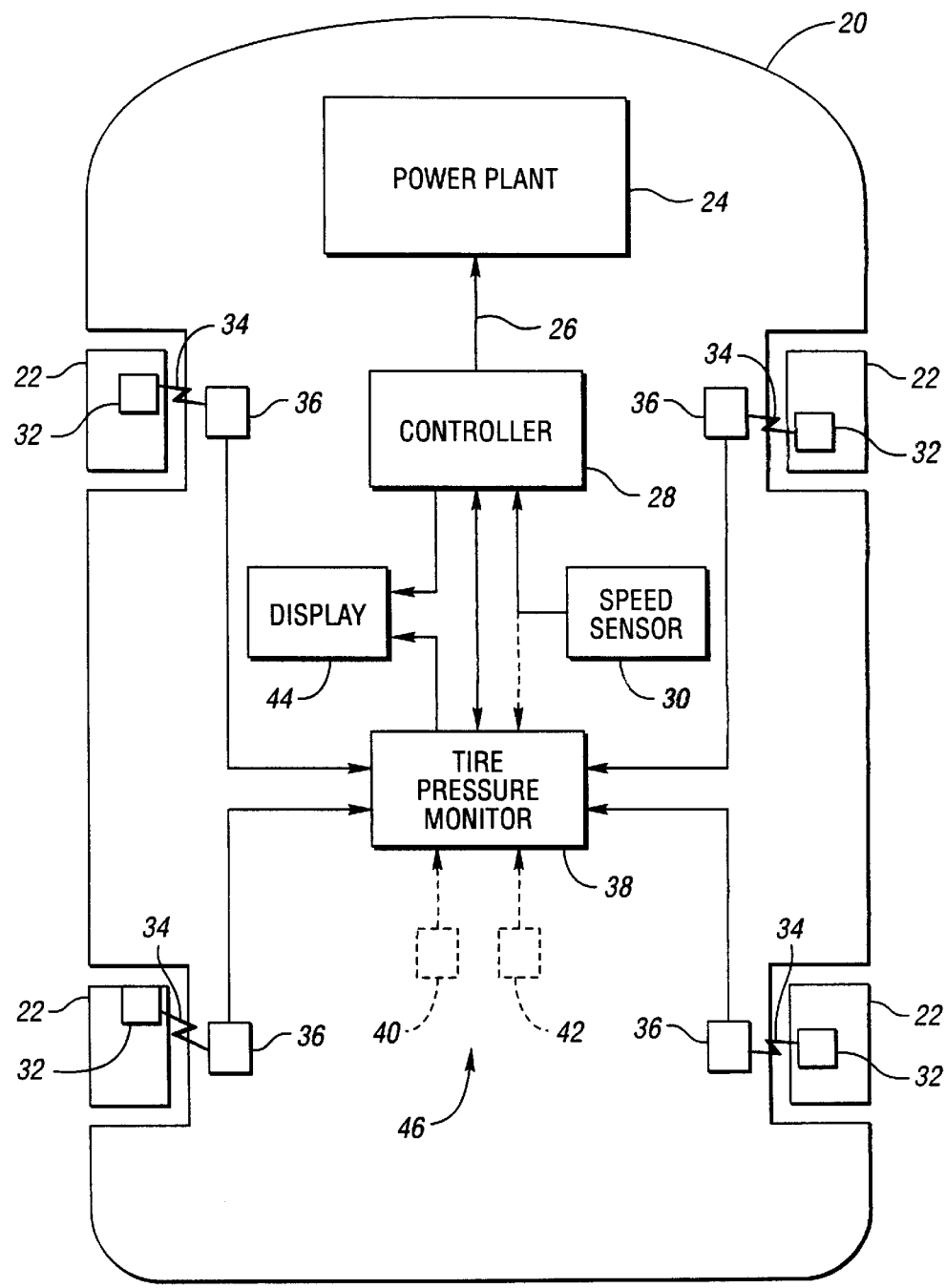
FIG. 1 is a block diagram of a system for limiting vehicle speed based on tire pressure according to an embodiment of the present invention.

Referring to FIG. 1, a block diagram of a system for limiting vehicle speed based on tire pressure according to an embodiment of the present invention is shown. Wheeled vehicle 20 has one or more tires 22, at least one of which is typically driven by power plant 24 to propel vehicle 20 at a particular vehicle speed. Any form of power plant 24 may be used, including gasoline engines, turbines, diesel engines, electric motors, and the like. Power plant 24 receives power plant control signals 26 from power plant controller 28.

Power plant controller 28 controls the operation of power plant 24 by receiving inputs from a variety of sensors such as speed sensor 30 measuring the speed of vehicle 20. Power plant control signals 26 modify the operation of power plant 24 through a variety of means depending, in part, on the type of power plant 24. These include controlling the delivery of fuel, spark, and air to an engine powering vehicle 20; controlling the revolution rate of a rotating power plant 24 powering vehicle 20; and controlling the delivery of electrical power to a motor powering vehicle 20. Thus, power plant 24, controller 28, and speed sensor 30 form a closed loop system that may be used to control the speed of vehicle 20.

At least one tire 22, and preferably each tire 22, are monitored for tire inflation pressure and temperature by tire sensors 32. Typically, tire sensor 32 is located within tire 22 or is attached to an inflation valve for tire 22. Preferably, tire sensor 32 measures the air pressure and temperature within tire 22. Tire sensor 32 or an associated sensor may also measure one or more additional parameters associated with tire 22, such as tire usage, tire life, and the like. Also, separate sensors within tire 22 may measure temperature and pressure. A preferred tire sensor 32 is the model SP13 or similar model from SensoNor asa of Norton, Norway.

Information is transmitted from tire sensor 32 through wireless link 34 to one or more receivers 36. Wireless link 34 is preferably a radio link, but may be established through any wireless means including ultrasonic, subsonic, magnetic coupling, and the like. Each tire 22 may have an associated receiver 36 or receiver 36 may be located in a central position within vehicle 20. Receiver 36 forwards tire pressure, tire temperature, and related information to, or is, incorporated into, tire monitor 38.

Tire monitor 38 may perform a variety of functions. Tire monitor 38 calculates the pressure and temperature in each tire 22 based on signals from receivers 36. Tire monitor 38 may calculate the pressure in each tire 22 based on information from other sensors, such as ambient pressure sensor 40, ambient temperature sensor 42, and the like. Tire monitor 38 may also calculate the temperature in each tire 22 based on information from other sensors. Tire monitor 38 may also display information about the pressure, temperature or other operating parameters in each tire 22 on display 44 viewable by an operator of vehicle 20.

Together, power plant controller 28 and tire monitor 38 comprise control logic generating power plant control signals 26 to automatically control the speed of vehicle 20 if the vehicle speed is not appropriate for at least one tire 22 based on the sensed tire air pressure, tire temperature, or both. Vehicle speed control may include reducing vehicle speed and preventing vehicle speed from exceeding a limiting speed. The limiting speed may be a preset value or may be calculated based on vehicle operating conditions. As will be recognized by one of ordinary skill in the art, controller 28 and tire monitor 38 may be incorporated into the same device or may be divided between two or more devices. Control logic 46 may also be distributed to one or more receivers 36 and intelligent tire sensors 32. Preferably, control logic 46 is implemented as one or more microcontrollers. Some or all of control logic 46 may also be implemented using discrete components, programmable logic devices, gate arrays, custom integrated circuit chips, and the like.

Preferably, control logic 46 provides notification to an operator of vehicle 20 when speed is limited or reduced. This notification may be accomplished through an indicator lamp or illuminated graphic, through an image and/or text displayed on a screen, through an audio warning, through a heads-up display, or the like. Any such notification is represented generally by display 44.

Control logic 46 may also suspend automatic speed reduction based on the pressure or temperature in a tire 22 sent by tire sensor 32 with a fault or other detected problem. Tire sensor 32 may perform self diagnostic tests such as transducer failure, low battery, circuitry failure, and the like. Tire sensor 32 may generate a signal indicating a failed self diagnostic test. Control logic 46 may then warn the vehicle operator through display 44 and ignore any subsequent out-of-range signal from tire sensor 32 until a passing self diagnosis signal is received from tire sensor 32 or until control logic 46 is reset, such as after replacing tire sensor 32.

Figure 2:
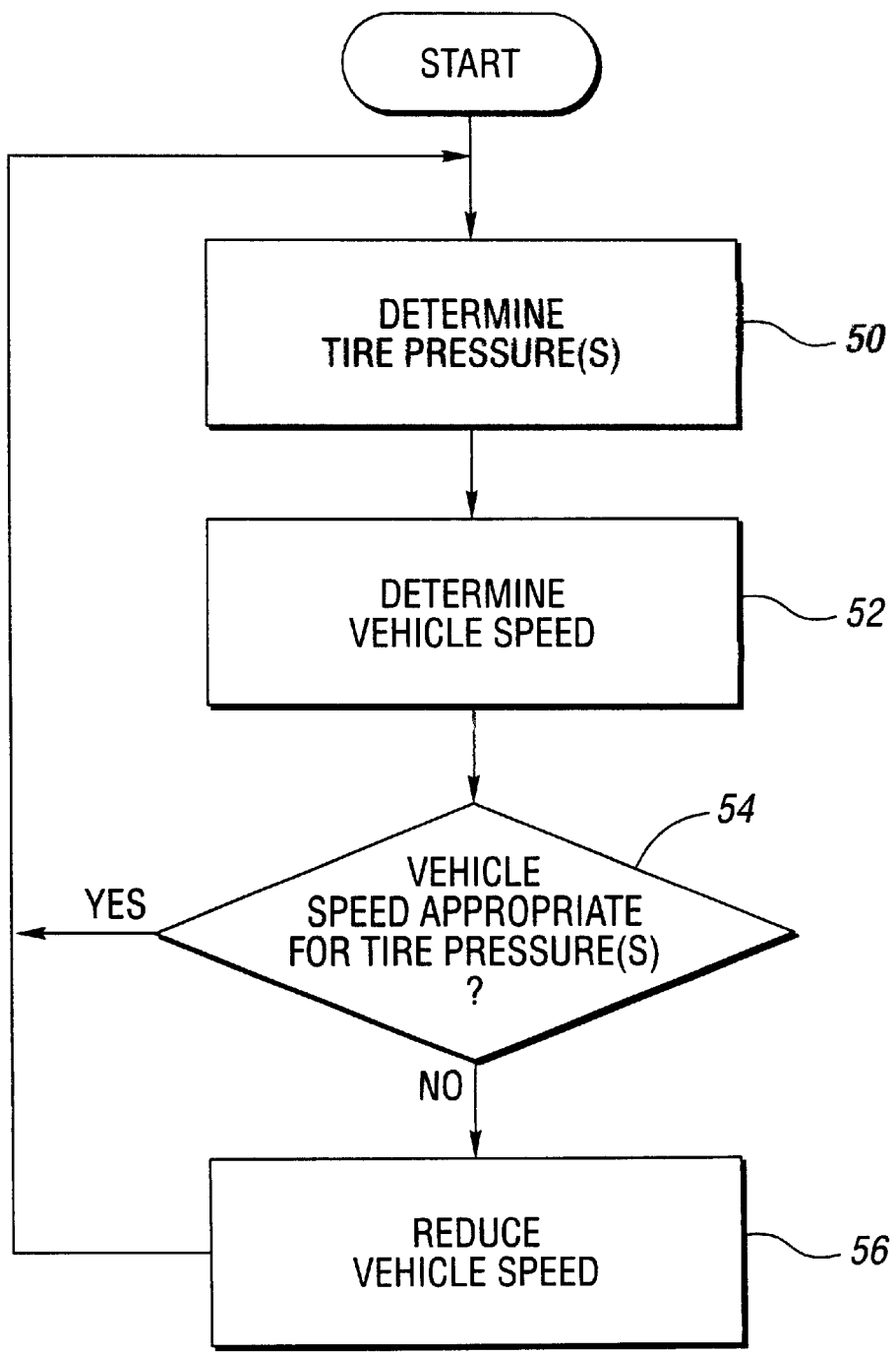
FIG. 2 is a flow diagram of a method for limiting vehicle speed based on tire pressure according to an embodiment of the present invention.

Referring now to FIG. 2, a flow diagram of a method for limiting vehicle speed based on tire pressure according to an embodiment of the present invention is shown. As will be appreciated by one of ordinary skill in the art, the operations illustrated in the flow diagram are not necessarily sequential operations. The order of steps may be modified within the spirit and scope of the present invention. Also, the method illustrated in FIG. 2 may be implemented by any combination of hardware, software, firmware, and the like. The present invention transcends any particular implementation and the embodiment is shown in sequential flow chart form for ease of illustration. Further, tire temperature may be substituted for tire pressure in determining speed limiting.

Tire pressures are determined in block 50. Tire pressures are based on measurements taken by one or more tire pressure sensors 32. These measurements may be corrected for sensor characteristics, such as non-linearity and drift, and may be compensated for sensor cross-sensitivities such as temperature. Additional factors, such as ambient temperature, ambient pressure, tire loading, and the like, may be taken into account to improve measurement accuracy. Tire pressure calculation may take place in one or more of tire sensor 32, receiver 36, tire monitor 38, or controller 28.

Vehicle speed is determined in block 52. Speed sensor 30 measures the speed of vehicle 20. A wide variety of devices, methods, and locations for measuring the speed of vehicle 20 are known in the art. The actual vehicle speed or a value representing vehicle speed may be calculated from information supplied by speed sensor 30 in either or both of controller 28 and tire monitor 38. The speed of vehicle 20 is typically displayed on display 44.

A check is made to determine if vehicle speed is appropriate for tire pressures in block 54. One or more of several comparisons may be used to determine if the speed of vehicle 20 is appropriate. First, vehicle speed may not be appropriate if the pressure in one or more tires 22 is less than a minimum value. This minimum value may be based on one or more operating conditions of vehicle 20 such as vehicle load and load distribution, four-wheel drive mode, towing mode, automatic suspension mode, traction control operation, automatic brake system control, tire location, air pressure in other tires, ambient air pressure, tire temperature, temperature in other tires, ambient temperature, and the like. Second, vehicle speed may not be appropriate if one or more tires 22 have a tire pressure less than a value based on the speed of vehicle 20. Third, vehicle speed may not be appropriate if one or more tires 22 have a tire pressure greater than a maximum value. As with the minimum value, the maximum value may be based on one or more vehicle operating conditions. Fourth, vehicle speed may not be appropriate if one or more tires 22 have a tire pressure greater than a value based on the vehicle speed. If vehicle speed is appropriate for tire pressures, the process of determining tire pressures and vehicle speed is repeated.

If vehicle speed is not appropriate for one or more tire pressures, the vehicle speed is reduced in block 56. The speed of vehicle 20 may be reduced to a value that is preset or based on one or more vehicle operating conditions. The maximum allowable speed may also be a function of the pressure in one or more tires 22. Preferably, controller 28 reduces the speed of vehicle 20 gradually until the speed of vehicle 20 is appropriate for the pressure in tires 22. Controller 28 reduces the speed of vehicle 20 by generating power plant control signals 26 to control one or more parameters of power plant 24. Preferably, the vehicle operator is warned if vehicle speed is reduced due to measured tire pressure. The process of determining tire pressures and vehicle speed is then repeated.

Figure 3:
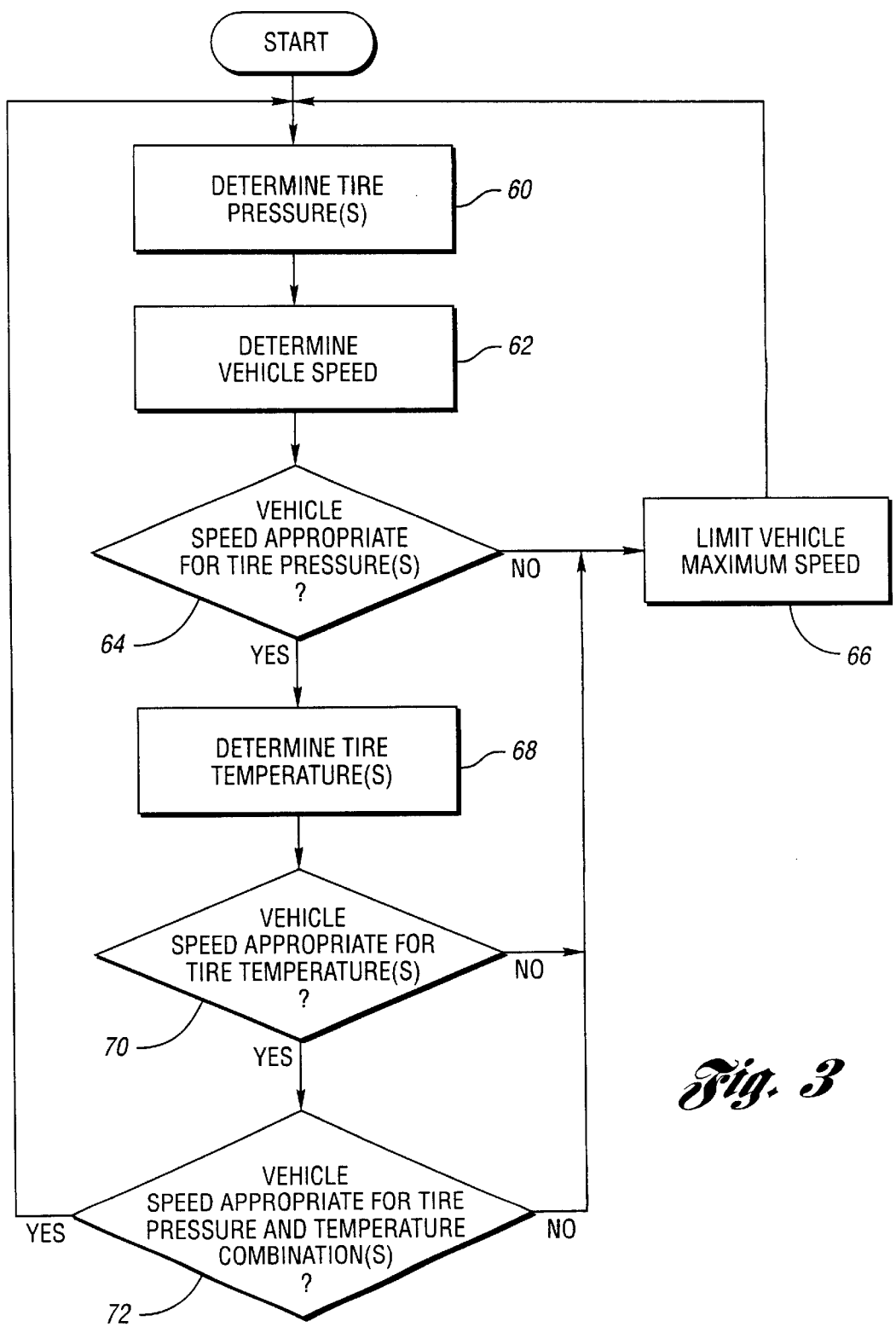
FIG. 3 is a flow diagram of a method for limiting vehicle speed based on tire pressure and temperature according to an embodiment of the present invention.

Referring now to FIG. 3, a flow diagram of a method for limiting vehicle speed based on tire pressure and temperature according to an embodiment of the present invention is shown. As will be appreciated by one of ordinary skill in the art, the operations illustrated in the flow diagram are not necessarily sequential operations. The order of steps may be modified within the spirit and scope of the present invention. Also, the method illustrated in FIG. 3 may be implemented by any combination of hardware, software, firmware, and the like. The present invention transcends any particular implementation and the embodiment is shown in sequential flow chart form for ease of illustration.

One or more tire pressures are determined in block 60. Tire pressures are based on measurements taken by one or more tire sensors 32. These measurements may be corrected for sensor measurement characteristics and cross-sensitivities. Tire pressure calculation may take place in one or more of tire sensor 32, receiver 36, tire monitor 38, or controller 28. Vehicle speed is determined in block 62. Speed sensor 30 measures the speed of vehicle 20.

A check is made to determine if vehicle speed is appropriate for tire pressures in block 54. Preferably, at least one threshold value for tire pressure is determined based on one or more vehicle operating parameters. Each tire pressure is compared against one or more corresponding pressure threshold value. If a threshold value is exceeded, the maximum vehicle speed is limited as in block 66.

One or more tire temperatures are determined in block 68. Tire temperatures are based on measurements taken by one or more tire sensors 32. These measurements may be corrected for sensor measurement characteristics and cross-sensitivities. Tire temperature calculation may take place in one or more of tire sensor 32, receiver 36, tire monitor 38, or controller 28.

A check is made to determine if vehicle speed is appropriate for tire temperatures in block 70. Preferably, at least one threshold value for tire temperature is determined based on one or more vehicle operating parameters. Each tire temperature is compared against one or more corresponding temperature threshold value. If a threshold value is exceeded, the maximum vehicle speed is limited as in block 66.

A check is made to determine if vehicle speed is appropriate for both tire pressures and temperatures in block 72. Both tire pressure and temperature are used to determine if speed limiting is required. For example, higher tire temperature may require speed limiting at a lower tire pressure than a tire pressure without temperature consideration. If a threshold value is exceeded, the maximum vehicle speed is limited as in block 66.

Specific values for speed limiting thresholds depend on a wide variety of factors, including vehicle size and weight, load, load distribution, driving conditions, tire size, tire type, tire age and wear, and the like.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of limiting vehicle speed comprising:
   sensing the air pressure in at least one tire;
   sensing temperature in the at least one tire;
   sensing vehicle speed;
   determining at least one threshold based on at least one parameter of vehicle operation;
   determining if the vehicle speed is appropriate for each tire based on the sensed tire air pressure, the sensed tire temperature and on each determined threshold; and
   automatically controlling vehicle speed if the vehicle speed is not appropriate for each tire.

2. A method of limiting vehicle speed as in claim 1 wherein reducing vehicle speed comprises controlling the delivery of fuel to an engine powering the vehicle.

3. A method of limiting vehicle speed as in claim 1 wherein reducing vehicle speed comprises controlling the delivery of spark to an engine powering the vehicle.

4. A method of limiting vehicle speed as in claim 1 wherein reducing vehicle speed comprises controlling the delivery of air to an engine powering the vehicle.

5. A method of limiting vehicle speed as in claim 1 wherein reducing vehicle speed comprises controlling the revolution rate of a rotating power plant powering the vehicle.

6. A method of limiting vehicle speed as in claim 1 wherein reducing vehicle speed comprises controlling the delivery of electrical power to a motor powering the vehicle.

7. A method of limiting vehicle speed as in claim 1 wherein the at least one threshold comprises a maximum pressure threshold, the vehicle speed being not appropriate for the tire if the tire pressure is greater than the maximum pressure threshold.

8. A method of limiting vehicle speed as in claim 1 wherein the at least one threshold comprises a minimum pressure threshold, the vehicle speed being not appropriate for the tire if the tire pressure is less than the minimum pressure threshold.

9. A method of limiting vehicle speed as in claim 1 wherein the at least one threshold comprises a maximum temperature threshold, the vehicle speed being not appropriate for the tire if the tire temperature is greater than the maximum temperature threshold.

10. A method of limiting vehicle speed as in claim 1 wherein the at least one threshold comprises a minimum temperature threshold, the vehicle speed being not appropriate for the tire if the tire temperature is less than the minimum temperature threshold.

11. A method of limiting vehicle speed as in claim 1 wherein the at least one parameter of vehicle operation consists of at least one from a set including vehicle load, vehicle load distribution, four-wheel drive mode, towing mode, automatic suspension mode, traction control operation, automatic brake system control, tire location, air pressure in other tires, temperature in other tires, ambient air pressure, and ambient temperature.

12. A method of limiting vehicle speed as in claim 1 wherein the at least one parameter of vehicle operation comprises vehicle speed.

13. A method of limiting vehicle speed as in claim 1 further comprising indicating automatic speed reduction to a vehicle operator.

14. A system for limiting vehicle speed comprising:
- at least one tire pressure sensor generating a pressure signal based on the pressure of air within a tire;
- at least one tire temperature sensor generating a temperature signal based on the temperature within the tire;
- a vehicle speed sensor generating a signal based on vehicle speed;
- a power plant causing the vehicle to move at the vehicle speed based on power plant control signals; and
- control logic in communication with each tire pressure sensor, the tire temperature sensor, the vehicle speed sensor and the power plant, the control logic generating at least one power plant control signal to automatically control vehicle speed if the vehicle speed is not appropriate for at least one tire based on the sensed tire air pressure, sensed tire temperature and on at least one vehicle operating condition.

15. A system for limiting vehicle speed as in claim 14 further comprising an indicator controlled by the control logic, the indicator indicating automatic speed reduction to a vehicle operator.

16. A system for limiting vehicle speed as in claim 14 wherein the control logic automatically reduces vehicle speed if the tire pressure is less than a minimum value based on the at least one vehicle operating condition.

17. A system for limiting vehicle speed as in claim 14 wherein the control logic automatically reduces vehicle speed if the tire pressure is greater than a maximum value based on the at least one vehicle operating condition.

18. A system for limiting vehicle speed as in claim 14 wherein the control logic automatically reduces vehicle speed if the tire temperature is less than a minimum value based on the at least one vehicle operating condition.

19. A system for limiting vehicle speed as in claim 14 wherein the control logic automatically reduces vehicle speed if the tire temperature is greater than a maximum value based on the at least one vehicle operating condition.

20. A system for limiting vehicle speed as in claim 14 wherein each tire pressure sensor generates a signal based on self diagnosis, the control logic inhibiting automatic vehicle speed reduction based on sensed tire air pressure for a tire with a pressure sensor generating a failed self diagnosis signal.

21. A system for limiting vehicle speed as in claim 20 further comprising an indicator controlled by the control logic, the indicator indicating the tire pressure sensor failed diagnostic testing.

22. A system for limiting vehicle speed as in claim 14 wherein the at least one vehicle operating condition consists of at least one from a set including vehicle load, vehicle load distribution, four-wheel drive mode, towing mode, automatic suspension mode, traction control operation, automatic brake system control, tire location, air pressure in other tires, temperature in other tires, ambient air pressure, and ambient temperature.

23. A system for limiting vehicle speed as in claim 14 wherein the at least one vehicle operation condition comprises vehicle speed.

24. A method of limiting vehicle speed comprising:
- determining tire pressure in at least one tire based on pressure sensed within the tire;
- determining vehicle speed;
- automatically limiting vehicle maximum speed if the vehicle speed is not appropriate for each tire based on the sensed tire air pressure;
- determining tire temperature in the at least one tire based on temperature sensed within the tire;
- automatically limiting vehicle maximum speed if the vehicle speed is not appropriate for each tire based on the sensed tire temperature; and
- automatically limiting vehicle maximum speed if the vehicle speed is not appropriate for each tire based on the sensed tire temperature and based on the sensed tire pressure.

* * * * *